US006881916B2

(12) United States Patent
McLaughlin et al.

(10) Patent No.: US 6,881,916 B2
(45) Date of Patent: Apr. 19, 2005

(54) FLATS SEQUENCING SYSTEM AND METHOD OF USE

(75) Inventors: Jason G. McLaughlin, Owego, NY (US); Michael A. Wisniewski, Owego, NY (US)

(73) Assignee: Lockheed Martin Corporation, Bethesda, MD (US)

(*) Notice: Subject to any disclaimer, the term of this patent is extended or adjusted under 35 U.S.C. 154(b) by 129 days.

(21) Appl. No.: 10/365,639

(22) Filed: Feb. 13, 2003

(65) Prior Publication Data

US 2004/0159592 A1 Aug. 19, 2004

(51) Int. Cl.[7] ............................ B07C 3/00; B65G 47/00
(52) U.S. Cl. ........................ 209/584; 209/900; 198/349
(58) Field of Search ................................ 209/583, 584, 209/900; 198/349, 350

(56) References Cited

U.S. PATENT DOCUMENTS 5,246,332 A 9/1993 Bernard, II et al.
5,353,938 A * 10/1994 LaGrange et al. .......... 209/584
5,385,243 A * 1/1995 Jackson et al. ............. 209/509
5,421,464 A * 6/1995 Gillmann et al. ........... 209/584
5,472,309 A 12/1995 Bernard, II et al.
5,901,855 A 5/1999 Uno et al.
5,994,657 A 11/1999 Maier et al.
6,316,741 B1 11/2001 Fitzgibbons et al.
6,741,908 B1 * 5/2004 Vanderbles et al. ......... 700/224
2002/0125177 A1 * 9/2002 Burns et al. ................ 209/630
2003/0141226 A1 * 7/2003 Morikawa ................... 209/584

* cited by examiner

*Primary Examiner*—Donald P. Walsh
*Assistant Examiner*—Joseph C Rodriguez
(74) *Attorney, Agent, or Firm*—McGuireWoods LLP

(57) ABSTRACT

A system and method sequencing objects in trays by assigning a direction to tray locations, where each of the tray locations provides space for trays. The objects are placed into the trays corresponding to assigned directions of the objects. A determination is made as to whether there are additional objects that correspond to the direction and, if so, the direction is assigned to unassigned tray locations based on pre-defined rules. Once all of the objects are in the trays, the trays are moved to the feeder system in a sequential order based on the directions. In a second pass, the directions are reassigned to the tray locations based on a number of trays required to hold the objects. The objects are placed into the trays corresponding to the directions of the objects. The trays are then transported to an unloading stage in a sequential order corresponding to the reassigned directions.

30 Claims, 7 Drawing Sheets

| | | | | | | | | | | | | | | | | | | |
|---|---|---|---|---|---|---|---|---|---|---|---|---|---|---|---|---|---|---|
| | | | | | | | | | | | | | | | | | | |
| | | | | BIN POSITIONS ON TOP BACK OF CAROUSEL | | | | | | | | | | | | | | |
| PARTITION | 1 | | BIN | 1 | 2 | 3 | 4 | 5 | 6 | 7 | 8 | 9 | 10 | 11 | 12 | 13 | 14 | |
| STARTING DIR | 1 | | FRONT | UN-ASSIGNED | | | | | 1 | 2 | 3 | 4 | 5 | 6 | 7 | 8 | 9 | … |
| ENDING DIR | 85 | | BACK | UN-ASSIGNED | | | | | | | | | | | | | | |
| | | | | BIN POSITIONS ON TOP FRONT OF CAROUSEL | | | | | | | | | | | | | | |
| PARTITION | 2 | | BIN | 180 | 179 | 178 | 177 | 176 | 175 | 174 | 173 | 172 | 171 | 170 | 169 | 168 | 167 | |
| STARTING DIR | 86 | | FRONT | UN-ASSIGNED | | | | | 86 | 87 | 88 | 89 | 90 | 91 | 92 | 93 | 94 | … |
| ENDING DIR | 170 | | BACK | UN-ASSIGNED | | | | | | | | | | | | | | |
| | | | | BIN POSITIONS ON BOTTOM BACK OF CAROUSEL | | | | | | | | | | | | | | |
| PARTITION | 4 | | BIN | 360 | 359 | 358 | 357 | 356 | 355 | 354 | 353 | 352 | 351 | 350 | 349 | 348 | 347 | |
| STARTING DIR | 256 | | FRONT | UN-ASSIGNED | | | | | 256 | 257 | 258 | 259 | 260 | 261 | 262 | 263 | 264 | … |
| ENDING DIR | 340 | | BACK | UN-ASSIGNED | | | | | | | | | | | | | | |
| | | | | BIN POSITIONS ON BOTTOM FRONT OF CAROUSEL | | | | | | | | | | | | | | |
| PARTITION | 3 | | BIN | 181 | 182 | 183 | 184 | 185 | 186 | 187 | 188 | 189 | 190 | 191 | 192 | 193 | 194 | |
| STARTING DIR | 171 | | FRONT | UN-ASSIGNED | | | | | 171 | 172 | 173 | 174 | 175 | 176 | 177 | 178 | 179 | … |
| ENDING DIR | 255 | | BACK | UN-ASSIGNED | | | | | | | | | | | | | | |
| | | | | | | | | | | | | | | | | | | |

FIG. 2

FLATS SEQUENCING SYSTEM AND METHOD OF USE

BACKGROUND OF THE INVENTION

1. Field of the Invention

The present invention generally relates to a sequencing system and method of use and, more particularly, to a sequencing system and method of use for flats and other objects.

2. Background Description

In view of increased demand on postal systems, worldwide, it has become very important to automate the sorting and delivery sequence of mail products such as magazines, newspapers, packages and other articles or flats. These automated processes must be able to sort the mail pieces in a delivery sequence so as to enable a postal carrier the ability to deliver the mail pieces in the most efficient route. This translates into less carriers needed to cover the number of delivery points along each delivery route. This ultimately reduces costs while increasing the productivity of the carrier. Without the automated processes, it would be virtually impossible for the postal system such as the United States Postal Service (USPS) to efficiently delivery the flats in a time sensitive and cost efficient manner.

Initially, the mail pieces are provided in random order to the postal service prior to being sequenced. In the past, these mail pieces were manually sequenced, but these manual processes were labor intensive and quite inefficient. This has led to the advent of automated systems, with much efficiency now being borne into the system. In the automated processes, increased accuracy and speed has become possible using bar code readers, feeding systems and transport systems and the like. In one type of automated system, for example, a multiple pass process is utilized which requires a first pass for addresses to be read by an optical character reader and thereafter the use of a multiple-pass sorting process. In the first pass, the mail pieces are separated into bins or holding trays and multiple further passes are used to reach a delivery sequence order. The bar-code labeling process and additional sorting steps required, however, involves additional processing time and sorting machine overhead as well as additional operator involvement to reach the result of delivery order sequence.

By way of one example, an automated system using a two pass algorithm is used to sort and sequence mail pieces. In this system, bar code readers and transport systems are used, but many shortcomings become apparent when using this type of system. For instance, the bar-code labeling process and additional sorting steps involves additional processing time, the need for sorting holding bins and additional operator involvement. Also, it is known that the sorting steps are prone to error thus leading to improper sequencing of the mail pieces, as the final product.

By use of a specific example to illustrate these shortcomings, a carousel-type system is able to handle approximately 40,000 pieces of mail per hour, and uses different holding trays for different set of delivery points. In using this type of system, each holding tray is provided in a bin section which is only capable of placement of a single holding tray. With this system, due to the limits of the holding tray placement spots and other shortcomings, the holding trays cannot be sequenced on the carousel, itself, but must be taken from the carousel, stored within a large storage area (flooring space), sorted, and returned to the carousel for a second pass. In the sorting process, many sorting errors result which reduces the efficiency of the system and leads to improper sequencing of the mail pieces.

Referring again to the specific example utilizing a two pass algorithm, directions are assigned to a set of delivery points, all of which are assigned to each partition in the carousel. Taking four directions with 16 delivery points, for example, a first portion of the algorithm may assign the following directions to each delivery point:

| | | | | |
|---|---|---|---|---|
| Direction #1 | 1 | 5 | 9 | 13 |
| Direction #2 | 2 | 6 | 10 | 14 |
| Direction #3 | 3 | 7 | 11 | 15 |
| Direction #4 | 4 | 8 | 12 | 16 |

That is, in row #1 (direction 1) there are delivery points for 1, 5, 9 and 13. In row #2, (direction 2) there are delivery points for 2, 6, 10 and 14. In row #3 (direction 3), there are delivery points for 3, 7, 11 and 15. Lastly, in row #4 (direction 4), there are delivery points for 4, 8, 12 and 16.

However, these sets of delivery points are not in any particular order. Also, due to the large volume of mail pieces assigned to a particular direction, it is necessary to have several holding trays for a particular number of mail pieces associated with a delivery point. But, in such an assignment, when the holding trays become filled, it is necessary to remove the holding trays from the carousel, place an empty holding tray at the respective bin section and continue filling the holding tray for that direction. When the holding tray is removed, though, it must be stored in a storage area until all of the holding trays are filled or all of the mail pieces for the particular carousel run have been placed in the respective holding trays. As can be imagined, this takes an enormous amount of valuable floor space, and additionally, requires the sorting of the holding trays into a proper order prior to a second pass through the system. The sorting process is time consuming and prone to sorting errors. In many instances, the sorting of the holding trays also has to be performed manually, which adds to time, cost and labor.

Once the holding trays are properly sorted, they are again fed back through the system. In doing so, it is now possible to reassign the directions in the following manner, for example,

| | | | | |
|---|---|---|---|---|
| Direction #1 | 1 | 2 | 3 | 4 |
| Direction #2 | 5 | 6 | 7 | 8 |
| Direction #3 | 9 | 10 | 11 | 12 |
| Direction #4 | 13 | 14 | 15 | 16 |

Now, each direction is a provided in sequenced set of delivery points. That is, direction 1 has delivery points for 1, 2, 3 and 4. Direction 2 has delivery points for 5, 6, 7, and 8. Direction 3 has delivery points for 9, 10, 11 and 12. Lastly, direction 4 has delivery points for 13, 14, 15 and 16.

But, it should be understood that the same problem exists. That is, after each holding tray is filled, it must be removed from the system, placed in a storage stage, and eventually sorted for future delivery. In the sorting process, it is necessary to ensure that the holding trays holding the mail pieces are provided in a proper sequence so as to enable the carrier to easily traverse his or her route in the most time and cost efficient manner. But, sorting errors are abound resulting, in many instances, an improper sequence order of the trays. This, of course, may lead to the improper delivery of the mail pieces to an incorrect delivery point.

Although this type of system is an improvement over manual sorting and sequencing, and allows for less delivery errors, there still remain many shortcomings. These shortcomings include sorting errors, the need for increased flooring space for storage, increased sorting and sequencing runs and the like. Also, if there are sorting errors, the carrier may find it difficult to efficiently traverse the assigned route, with many mail pieces being improperly delivered or undelivered. Also, there may be instances when manual intervention is needed, which increases labor costs and lowers efficiencies throughout the entire system. Thus, it is evident that much economy and improvement in delivery service could be obtained by accurately ordering of the mail pieces without the requirements for sorting of the holding trays and the like.

The present invention is directed to overcoming one or more of the problems as set forth above.

SUMMARY OF THE INVENTION

In a first aspect of the present invention, a method is provided for sequencing objects in trays located at tray locations of bin sections. The method includes assigning a predetermined direction to tray locations, where each of the tray locations provides space for trays. The predetermined direction may include a same direction or different directions for each tray location. The steps of this first aspect of the invention further include providing an unassigned designation to at least one tray location which provides tray space for placement of objects such that the placed objects remain in sequence. The objects are placed into the trays which correspond to assigned directions of the objects. A determination is made as to whether there are additional objects requiring placement corresponding to the same predetermined direction and, if so, the method assigns the predetermined direction to unassigned tray locations based on pre-defined rules. The objects are placed in the trays at the subsequently assigned tray locations. The trays are moved to the feeder system in a sequential order based on the predetermined direction.

In a second pass utilizing the first aspect of the present invention, the method includes reassigning the predetermined direction to the tray locations based on a number of trays required to hold the objects. The reassigning step ensures that a lower number reassigned direction is in front of a higher number reassigned direction in an unloading direction. The objects are placed into the trays of the tray locations corresponding to the directions associated with the objects. The trays are then transported to an unloading stage area in a sequential order corresponding to the reassigned direction.

In a second aspect of the present invention, the method includes providing a direction to front tray locations based on first pass pre-assignment rules. The direction may be a same direction or different directions dependent on an amount of routes required. The method includes a commencement of a first pass and a second pass. In the first pass:

(i) at least one front tray location is provided with an unassigned designation. The at least one front tray location provides tray space for placement of objects;

(ii) the objects are placed into trays corresponding to the direction associated with the objects;

(iii) the filled trays are moved onto a transporting system only if lower assigned trays remain unblocked. The moved trays will provide an empty tray location;

(iv) the empty tray location may be now designated as unassigned;

(v) a determination is then made as to whether there are additional objects requiring placement which correspond to the direction. If so, the direction will be assigned to the unassigned tray locations for placement of the additional objects; and (vi) the trays will be moved to a feeder system in sequential order of the assigned direction.

In the second pass of the second aspect of the invention, (i) the direction will be reassigned to the tray locations based on a number of trays required to hold the objects in the reassigned direction and, in aspects, whether there are more than two trays having a same assigned direction;

(ii) the objects will be placed into the trays at the tray locations associated with the reassigned directions. Each placed object is related to one of the reassigned directions of the tray locations in which the objects are placed; and (iii) the trays will be transported to an unloading area based on a sequential order of the reassigned directions.

In still another aspect of the present invention, a method of sequencing objects in trays located at tray locations of bin sections is provided. In the steps of this aspect, directions to tray locations are pre-assigned. Objects are placed in a tray in one of the tray locations such that each placed object is related to one of the directions of the tray locations in which the objects are place. The filled trays are moved in sequential order based on the directions. The tray locations are reassigned the direction and the objects are placed into the trays at the tray locations associated with the reassigned directions. The trays are transported to an unloading area based on a sequential order of the reassigned directions.

In yet another aspect of the present invention, a system for sequencing objects in trays located at tray locations of bin sections is provided. In this system a module is provided which assigns a predetermined direction to tray locations. The predetermined direction includes a same direction or different directions and each of the tray locations provides space for trays. A first pass module controls the assignment designation to at least one tray location of the tray locations. This module also controls placement of the objects into the trays of the tray locations corresponding to assigned directions of the objects. The first pass module also determines whether there are additional objects requiring placement which correspond to the predetermined direction and, if so, assigns the predetermined direction to unassigned tray locations based on pre-defined rules. Thereafter, the first pass module controls the movement of the trays to a feeder system in sequential order based on the predetermined direction.

The second pass module of this aspect of the invention controls the reassignment of the predetermined direction to the tray locations based on a number of trays required to hold the objects. The reassignment ensures that a lower number reassigned direction is in front of a higher number reassigned direction in an unloading direction. The second pass module then controls placement of the objects into the trays and transportation of the trays to a loading area in a sequential order corresponding to the reassigned direction.

In another aspect of the present invention, a system is provided for sequencing objects in trays located at tray locations of bin sections. The system includes a mechanism for pre-assigning a direction to tray locations adapted for placing trays and a mechanism for placing an object in a tray corresponding to the direction. Additionally, a mechanism is provided for moving trays with the objects through a transporting system of the feeder system in sequential order based on predefined rules. A mechanism is provided for reassigning the direction to the tray locations based on a number of trays required to hold the objects in the reassigned direction. A mechanism is also provided for transporting the trays once objects are placed in the trays having a corresponding direction to an unloading area based on a sequential order of the reassigned directions.

In another aspect of the present invention a sequencing system includes at least one feeder having a reading device and a moving mechanism provided to hold a plurality of holding devices. The system further includes at least one bin positioned adjacent to the moving mechanism, each bin being designated with at least one front tray location and at least one rear tray location capable of being assigned to a direction. A transporting system is adjacent the front tray location. The transporting system either transports objects to the at least one feeder and to a delivery point in sequential order.

BRIEF DESCRIPTION OF THE DRAWINGS

The foregoing and other objects, aspects and advantages will be better understood from the following detailed description of a preferred embodiment of the invention with reference to the drawings, in which:

FIG. 2 shows an example of a first pass pre-assignment rule in accordance with an embodiment of the present invention;

DETAILED DESCRIPTION OF A PREFERRED EMBODIMENT OF THE INVENTION

The present invention is directed to a system and method for sequencing flats and other objects. These flats and objects, hereinafter referred to as flats, may be mail pieces, magazines, catalogs, bundles or other defined objects having certain predefined dimensions. The system and method of the present invention may be used to sequence flats for delivery by a postal system such as the United States Postal Service, or is also well adapted to sequencing flats for warehousing or storage. By using the method and system of the present invention, sorting and excessive movement of holding trays may be eliminated thus reducing the need for additional flooring space, as well as eliminating potential sorting errors due to excess sorting steps. The use of the present invention also reduces the steps needed to sequence the flats and thus reduces associated costs and the like.

Embodiments of Flats Sequencing and Method of Use of the Present Invention

Figure 1:
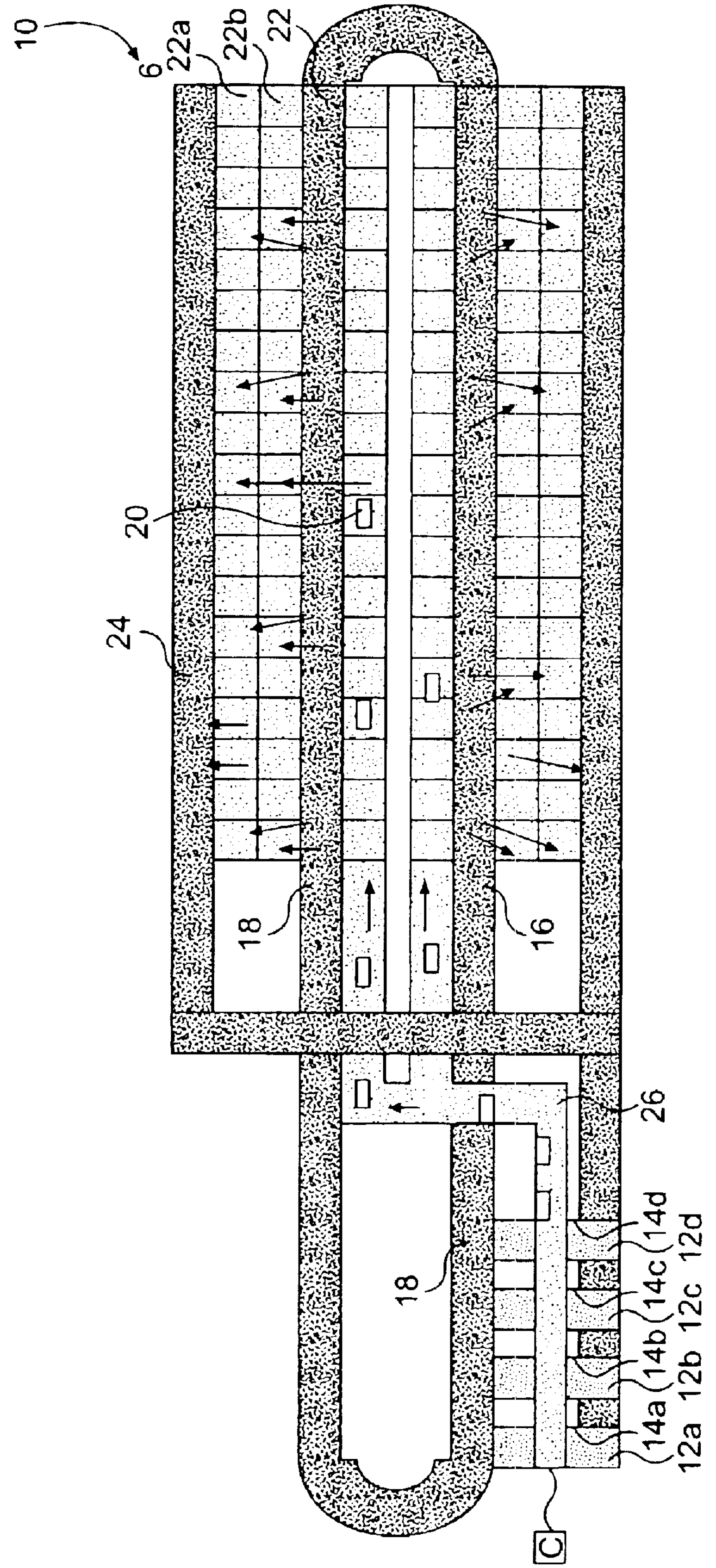
FIG. 1 shows an embodiment of the tray sequencing system of the present invention.

FIG. 1 shows an embodiment of the tray sequencing system of the present invention. The tray sequencing system of the present invention is generally depicted as reference numeral 10 and includes a plurality of flat feeders 12*a*–12*d*, each having a bar code scanner 14*a*–14*d*, respectively, or other optical reading device. Those of ordinary skill in the art, though, should recognize that any number of feeders and respective optical reading devices may be used with the present invention and that the use of four flat feeders and respective optical reading devices is provided for illustrative purposes only. Thus, the present invention is not limited to any number of flat feeders and respective reading devices.

Still referring to FIG. 1, a carousel 16 is provided to hold a plurality of carriers 18. The carousel 16, in one embodiment, is a two tiered continuous looped transport system in which each carrier 18 is designed to include four pockets, each assigned to a respective flat feeder 12*a*–12*d*. In use, the feeders 12*a*–12*d* are designed to deposit flats into the respective carriers 18 for transport to holding trays 20 positioned at a respective bin 22. The holding trays may be designed to hold any number of flats, depending on the application of the present invention. Information from the flats are read by the bar code scanners or other optical devices and stored for future use by the system of the present invention. A control system "C" controls the system and processes of the present invention. The deposited flats may be transported from the feeders to the carriers and then into the trays by any well-known or conventional system. For example, the system may use known robotics, mail handling systems and like to effectuate the handling of the flats throughout the entire system.

At each bin 22, is a front tray location 22*a* and rear or back tray location 22*b* each capable of being assigned to a direction (i.e., a logical assignment of a set of delivery points selected for sequencing the flats). In embodiments, the front tray location 22*a* is located closest to a conveying system 24 and the back tray location 22*b* is located farthest from the conveying system 24. In embodiments, for example, the front tray location 22*a* may be on a first side of the carousel 16 closest to the conveying system 24 and the back tray location 22*b* may be on the other side of the carousel 16, farther away from the conveying system 24. Of course, there may be other configurations following this ordering scheme, and additionally there may be three or more tray locations for each bin section, depending on the application of the present invention. The trays 20 are transported to the tray locations via a tray conveying system 26. The conveying system may carry the trays (i) back to the feeders for a second pass or (ii) in a sequential delivery order to an unloading area for future delivery or storage after the second pass is complete.

FIG. 2 shows an example of a first pass pre-assignment rule in accordance with an embodiment of the present invention. In this illustration, the pre-assignment rule is associated with the use of the tray sequencing system 10 of FIG. 1. That is, the first pass pre-assignment rule of FIG. 2 is used with a system having four feeders and includes four partitions. In addition, the example of FIG. 2 uses 360 bin sections numbered 1 through 360, each bin section having a front tray location and a back tray location. In the example of FIG. 2, each partition thus has 90 bin sections (i.e., 360 bins/4 partitions). Also, in the example of FIG. 2, 85 directions are assigned to each of the four partitions thus providing for 340 directions. The directions, in this example, are merely illustrative of an amount of routes the present invention will sequence for future delivery. The directions may be assigned in the following manner: 650 delivery points per carrier (any arbitrarily assigned number) are multiplied by 11 carriers for each partition. This equals 7150, of which the square root equals approximately 85 directions.

In the pre-assignment rule, directions are assigned to a respective tray location, with the exception of at least one front tray location being unassigned. In this example, all back tray locations are unassigned. The use of the unassigned tray location(s) will become apparent in view of the flow diagrams and further examples discussed below.

In the example of FIG. 2, the first pass pre-assignment rule assigns 85 directions to each partition. In the 1st partition, directions 1–85 are pre-assigned to front tray locations of bin sections 6–90, leaving bin sections 1–5 unassigned. In the 2nd partition, directions 86–170 are pre-assigned to front tray locations of bin sections 91–175, leaving bin sections 176–180 unassigned. In the 3rd partition, directions 171–255 are pre-assigned to front tray locations of bin sections 186–270, leaving bin sections 181–185 unassigned. In the 4th partition, directions 259–340 are pre-assigned to front tray locations of bin sections 270–355, leaving bin sections 356–360 unassigned. It should be recognized that due to the configuration of the looped carousel, the bin sections of the 1st and 3rd partitions will be numbered in increasing sequential order leading away from the feeders. In contrast, the bin sections of the 2nd and 4th partitions will be numbered in increasing sequential order as they are located closer to the feeders.

Those of ordinary skill in the art should recognize that more or less than four partitions might be used with more or less than 360 bin sections. Additionally, the numbering of the bin sections may also vary depending on the configuration of the looped carousal, the number of delivery points, etc. By way of example, two partitions each having 50 bin sections and 45 directions may be implemented using the first pre-assignment rule of the present invention. In this scenario, (i) directions 1–45 may be pre-assigned to the front tray locations of bin sections 6–50, with front tray locations of bin sections 1–5 being unassigned, and (ii) directions 46–90 may be pre-assigned to front tray locations of bin sections 56–100, with front tray locations of bin sections 51–55 being unassigned.

As another example, 48 directions may be assigned to the 50 bin sections of each partition. In this example, (i) directions 1–48 may be pre-assigned to front tray locations of bin sections 3–50, with bins 1 and 2 being unassigned, and (ii) directions 49–98 may be pre-assigned to front tray locations of bin sections 58–100 with bin sections 51 and 52 being unassigned.

Again, in these examples, all back tray locations are unassigned.

Figure 3:
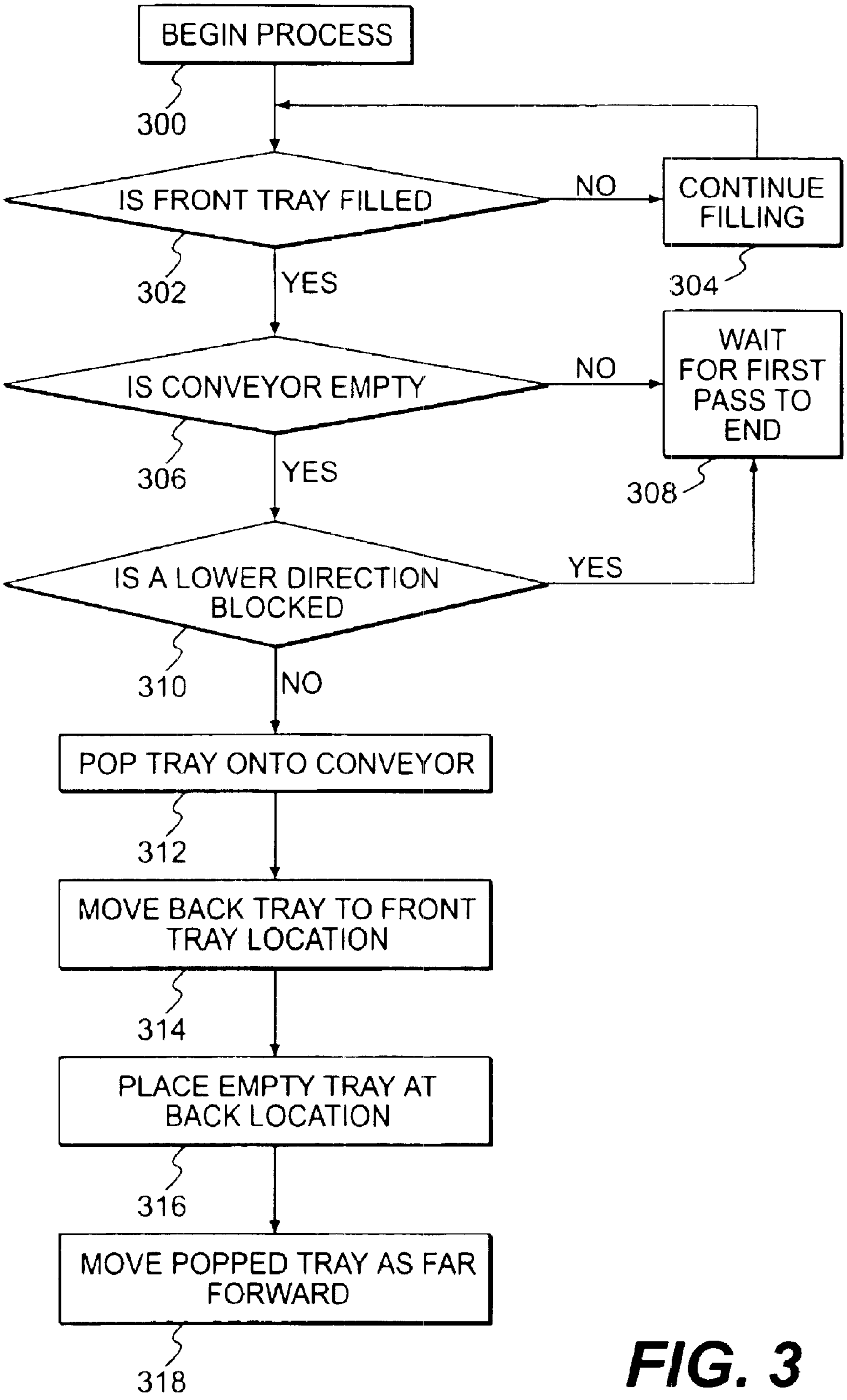
FIG. 3 shows a flow diagram for sequencing flats during a first pass using an embodiment of the tray sequencing system of FIG. 1.

FIG. 3 shows a flow diagram for sequencing flats during a first pass using an embodiment of the tray sequencing system of FIG. 1. In this flow, two trays are assigned to each bin section, and the initial bin allocation using the pre-assignment rule of FIG. 2 is provided. It should be noted that the flow diagram of FIG. 3 (and FIGS. 4 and 6) may represent a high-level block diagram of the present invention. A computer software program or hardwired circuit can be used to implement the steps of the present invention. In the case of software, the program can be stored on media such as, for example, magnetic media (e.g., diskette, tape, or fixed disc) or optical media such as a CD-ROM. Additionally, the software can be supplied via the Internet or some other type of network. A workstation or personal computer that typically runs the software includes a plurality of input/output devices and a system unit that includes both hardware and software necessary to provide the tools to execute the steps of the present invention.

Referring now more specifically to FIG. 3, in step 300, the process begins. At step 302, a determination is made as to whether a front tray associated with a pre-assigned direction is filled. If not, at step 304 the system will continue to fill the tray for that direction. If the front tray is filled, the process continues to step 306, at which time a determination is made as to whether the conveying system is empty in front of the filled tray. If filled (not empty), at step 308, the process waits until the first pass sequence ends. If the conveying system is empty in front of the filled tray, a determination is made at step 310 as to whether a lower direction tray will be blocked by moving the tray onto the conveying system. If not, the tray is moved onto the conveying system at step 312. If there is a blockage, the process returns to step 308. At step 314, the back tray is moved to the front tray location at an earliest convenience in order to ensure that an upcoming flat for that direction may still be loaded into the tray prior to such movement. In embodiments, this would be considered a "wait" time. And, at step 316 an empty tray is placed at the back tray location. At step 318, the tray is moved as far forward as possible on the conveying system without blocking a lower direction or pre-assignment.

Figure 4:
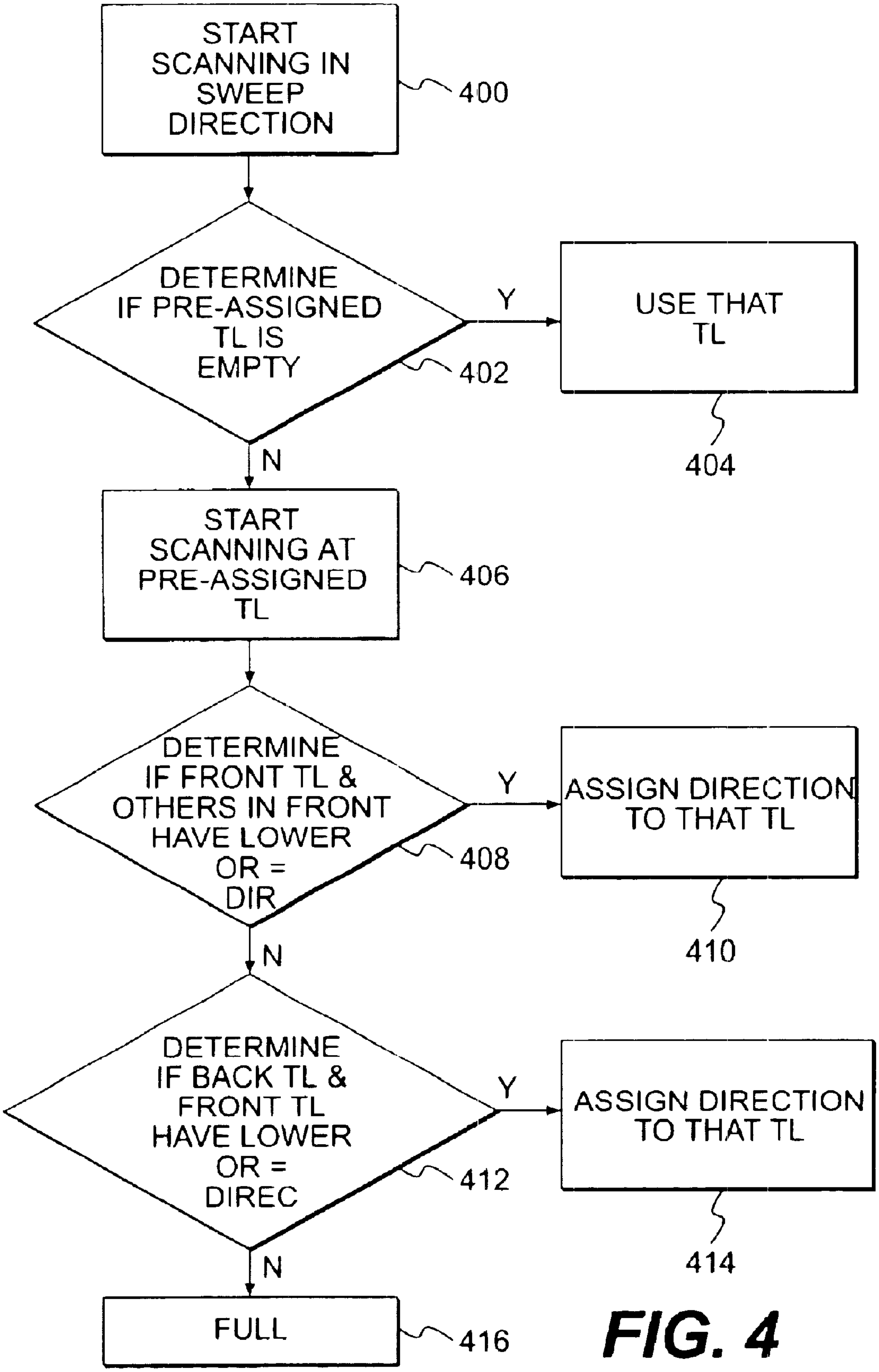
FIG. 4 shows a flow diagram for sequencing flats during a first pass using an embodiment of the tray sequencing system.

Now, FIG. 4 shows further steps for assigning tray locations when a tray is filled for a particular direction and overflow flats having the same direction must be dropped at a tray location. At step 400, the process starts to scan in a sweep direction starting with the pre-assigned location (i.e., the location of the filled tray for that direction). At step 402, a determination is made as to whether the pre-assigned tray location is empty. If the tray location is empty, the process then assigns that tray location the same direction at step 404. If not, at step 406 the process begins to scan in the sweep direction starting from the filled tray location for that direction. At step 408, a determination is made as to whether the front tray location is free and all trays on the conveying system toward the sweep direction have a lower or equal direction. If yes, then the process assigns the direction to that front tray location at step 410. If not, then a determination is made as to whether the back tray location is free and the front tray location has a lower or equal direction (step 412). If yes, at step 414 the process assigns the direction to that back tray location.

Figure 5:
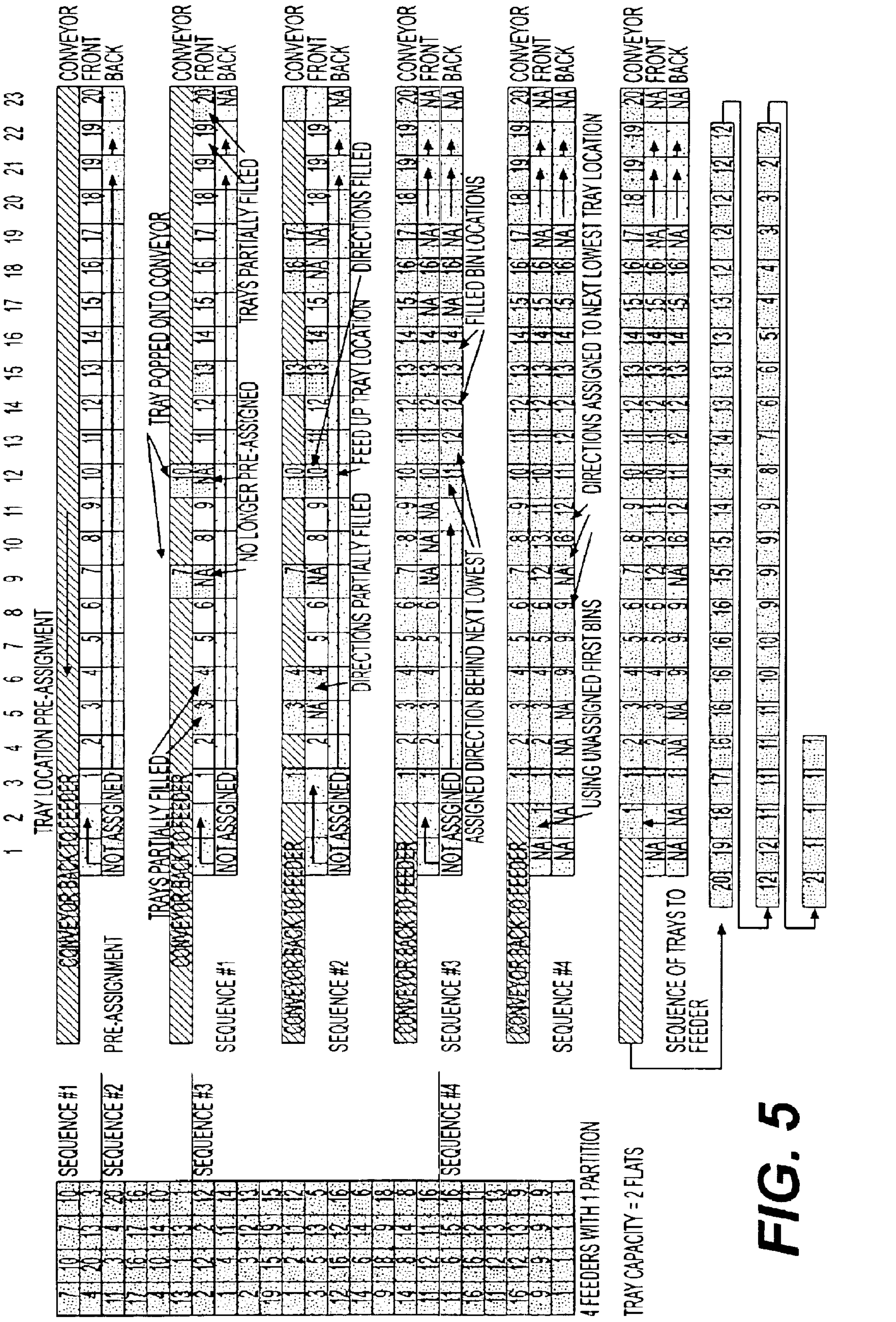
FIG. 5 is an illustrative example using the flow steps of FIGS. 3 and 4.

FIG. 5 shows an example implementing the steps of FIGS. 3 and 4. In FIG. 5, an example of two flats per tray is illustrated with the use of four feeders and one partition. In FIG. 5, the example also includes directions 1–20 with the use of 23 bin sections. Initially, front tray locations of bin sections 3–23 are assigned directions 1–20 (direction 19 is assigned to bin sections 21 and 22), with the remaining tray locations being unassigned. The unassigned bin sections include, amongst others, front tray locations of bin sections 1 and 2. It is well understood that the example of FIG. 5 is merely one illustrative example implementing the flow steps of FIGS. 3 and 4, and thus the present invention should not be limited in any manner to this specific example. Instead, the present invention contemplates many scenarios using the steps discussed herein such as the use of more or less sequences, more or less bin sections or the like.

Referring to sequence 1, front trays of directions 7 and 10 are filled (i.e., sequence 1 on the left side of the illustration shows two flats for direction 7 and 10) and moved onto the conveying system. The front tray locations for directions 7 and 10 are associated with bin sections 9 and 12, respectively. This is possible because the following holds true:

1. a front tray associated with a pre-assigned direction is filled (step 302);
2. the conveying system is empty in front of the tray (step 306); and 3. moving the tray onto the conveying system (step 312) will not block a lower direction tray (step 310).

Still referring specifically to direction 10, in sequence 2, the front tray of bin section 12 for direction 10 is filled. Referring to FIG. 4, this tray is filled, after scanning in the sweep direction (step 400), because it was determined that:

1. the pre-assigned tray location 10 was empty;
2. a new tray was moved in its place; and
3. the new tray was ready to be filled by flats having a direction of 10 (step 402).

In sequence 3, there are no further 10 directions. In this sequence, a discussion of the 11 and 12 directions will be illustrated using the steps of FIGS. 3 and 4. In this scenario, front trays assigned to direction 11 and direction 12 are both placed on the conveying system in accordance with the steps of FIG. 3. Also the front tray locations for directions 11 and 12 are filled in accordance with steps 400 and 402. (See, sequence 1 and 2.) Now, for direction 12, once the pre-assigned front tray of bin section 14 is filled, then the back tray of bin sections 14 and 13, in order, will be filled in accordance with steps 412 and 414. Similarly, for direction 11, once the pre-assigned front tray of bin section 13 is filled, and the back tray of bin 13 is partially filled with flats for direction 12, then the back tray of bin section 12 will be filled with flats for direction 11.

In sequence 4, the need for unassigned tray locations becomes apparent. Specifically, as the process moves through the steps of FIGS. 3 and 4, the lower directions may be assigned to the unassigned tray locations. This happens due to higher directions being assigned to tray locations in lower numbered bin sections, for example, with reference to direction 11. To illustrate this subtlety, direction 1, in sequence 4, is assigned to all tray locations and the conveying system position of bin section 3 and the front tray location of bin section 2, a previously unassigned location. This is due to direction 2 being assigned to bin section 4 and the requirement that four trays are needed for direction 1. Thus, the unassigned bin sections may become important, in certain embodiments, of the present invention.

It is also seen in this example, that previously assigned tray locations may become unassigned locations after filled trays are moved onto he transporting system (i.e., sequence 3, front tray locations of bin sections 9–11). In this specific situation, the previously assigned directions for 7, 8 and 9, in sequence 3 are turned into unassigned locations when the trays for the directions are moved onto the conveying system. Thereafter, using the steps of the present invention, these unassigned tray locations of bin sections are then reassigned directions 12, 13, 11, respectively, for sequence 4. In this manner, all lower directions remain unblocked by a higher direction.

Once all of the flats are properly loaded into the assigned trays, the trays are moved in sequential order to the feeder. That is, starting with the lowest to the highest assigned directions, all of the trays are placed on the conveying system and transported to the feeder for a second pass. By way of example, all of the trays assigned with a $1^{st}$ direction are placed on the conveying system prior all of the trays assigned with a $2^{nd}$ direction. This procedure is followed until all of the trays are placed on the conveyor, i.e., the trays assigned with directions 1–20. In this manner, the sequentially ordered trays will now reach the feeders in an order according to a set of delivery points, for a second and final pass.

Figure 6:
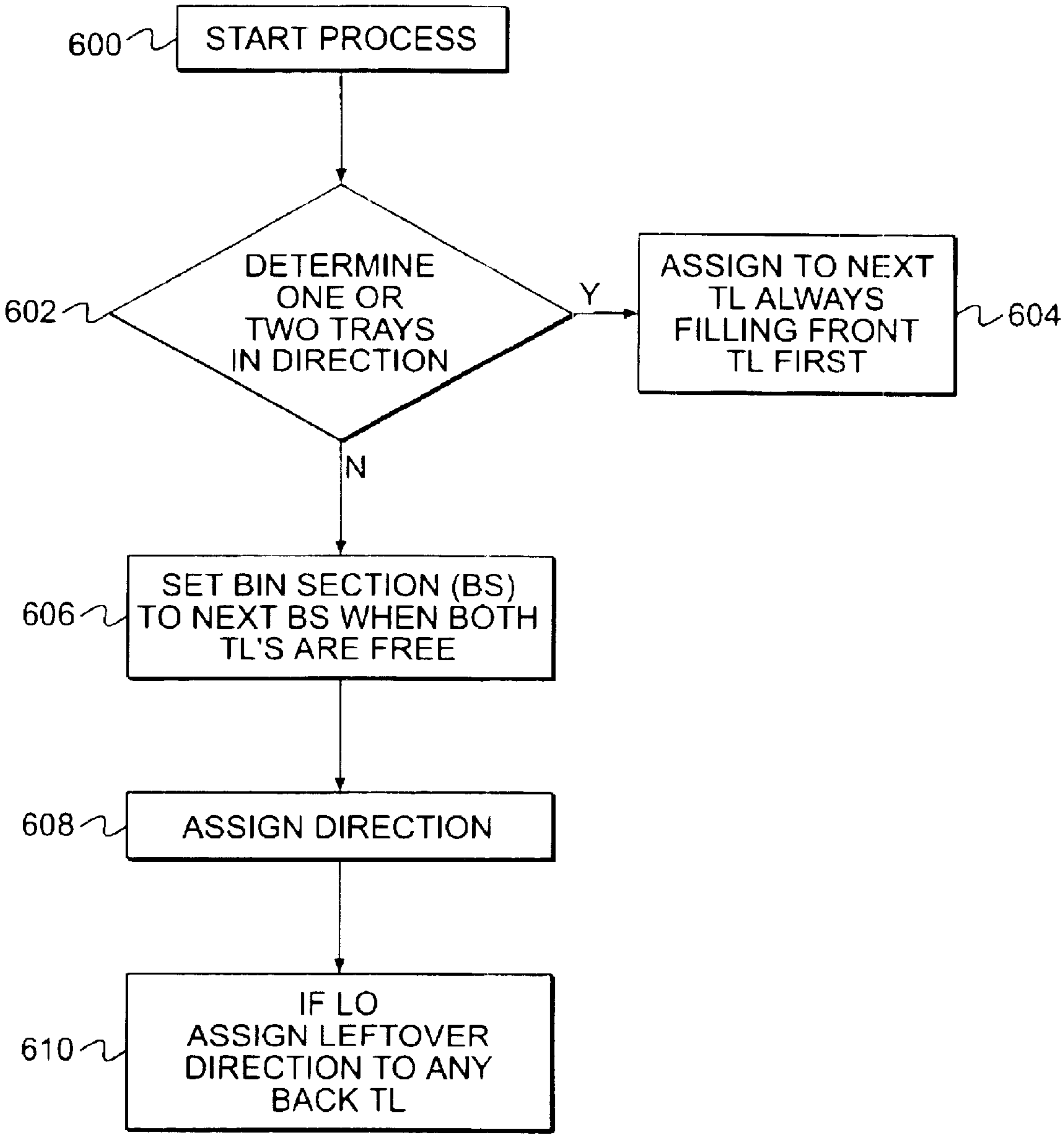
FIG. 6 shows a flow diagram for sequencing flats in a delivery order after completion of the first pass.

FIG. 6 shows a flow diagram for sequencing flats in a delivery order using a second pass. In this example, two trays are allocated to each bin section and the bin output can selectively output to one of the two trays. Additionally, the front tray is physically in front of the back tray such that the back tray cannot move to the conveying system through the front tray. Additionally, the pre-assigned tray locations are based on recorded data used in the first pass.

At step 600, the process starts scanning the first available tray location in a bin section. In this step, the scanning is performed away from the sweep order (away from the unloading area). At step 602, a determination is made as to whether there are one or two trays in the same direction. If yes, then the process proceeds to step 604. At step 604, the direction will be assigned to the next available tray location, always filling the front tray location first. If there are more than two trays for a direction, at step 606, the bin section is preset to the next bin section where all tray locations are free. At step 608, a direction is assigned to the bin section. In this step, the process assigns a direction to all conveying system positions between and including the preset bin location and the preset bin location−(number of trays per direction−X) and assigns all tray locations to the preset bin location−(number of trays per direction−X). In the case that the preset bin location−(number of trays per direction−X)<0, at step 610, all left over directions are assigned to any back tray location available in that partition. It should be understood that X could be any number that equals the number of tray locations and conveying system location for each bin section. For example, using the embodiment of FIG. 1, X=3.

Figure 7:
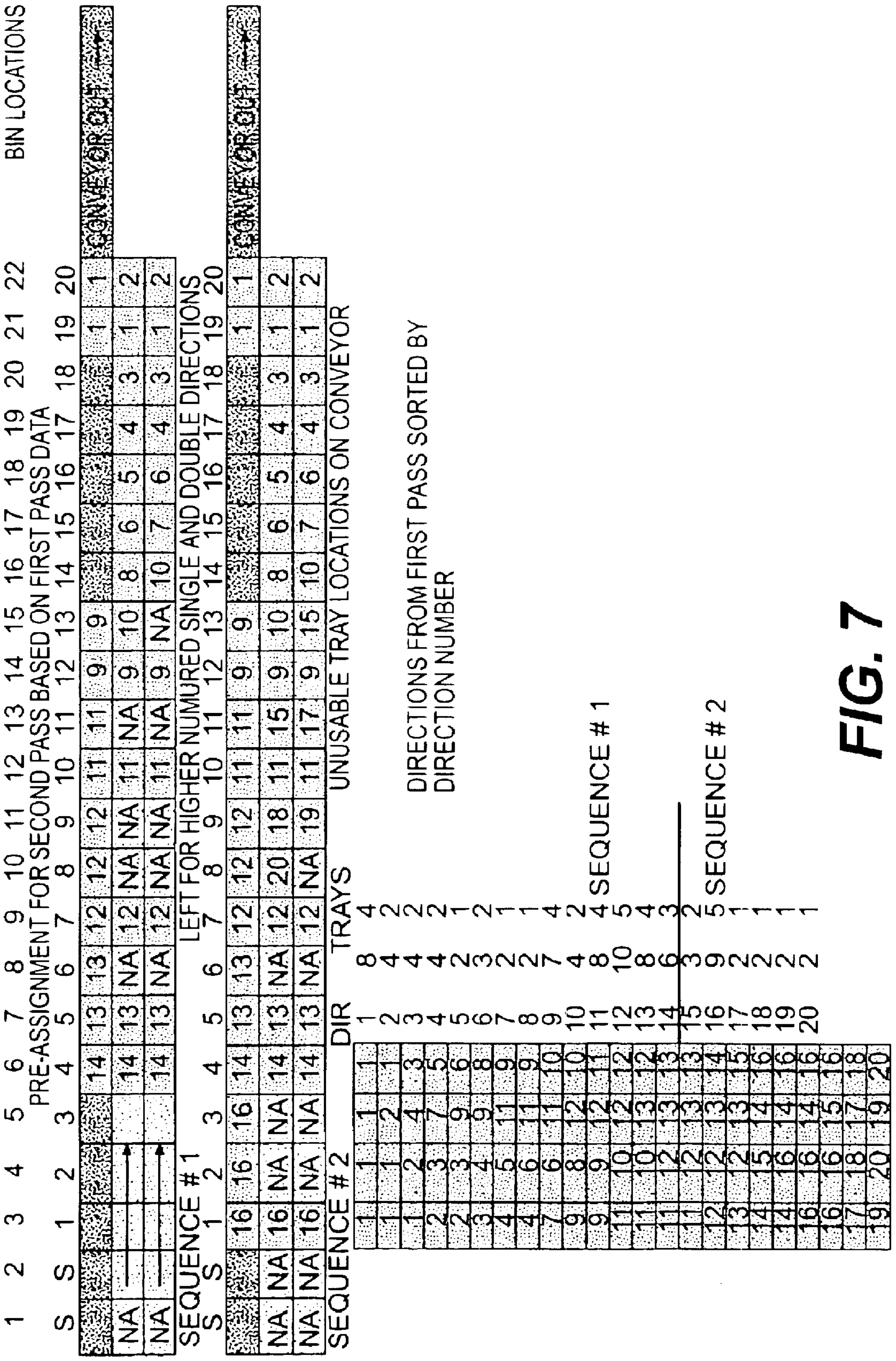
FIG. 7 is an illustrative example using the flow steps of FIG. 6.

FIG. 7 is an example implementing the flow steps of FIG. 6. The example of FIG. 7 is merely one illustrative example implementing the flow steps of FIG. 6, and thus the present invention should not be limited in any manner to this specific example. Instead, the present invention contemplates many scenarios using the steps discussed herein such as more or less sequences and more or less bin sections. In FIG. 7, two sequences are provided, with 20 directions. In this example, much like that discussed in the example of FIG. 5, each tray is capable of holding two flats. In this example, 22 bin sections are used and each bin section has two tray locations and one conveying system location (X=3).

Implementing the steps of FIG. 6, the following is illustrative of the use of several different directions. First, the pre-assigned tray locations are based on the recorded data used in the first pass. Then, it is determined that there are eight flats for direction 1, translating into four trays. For this example, a simplifying assumption is made that two flats equal a full tray, but in practice, many flats may make a full tray. Using the steps of FIG. 6, it is determined that there are more than two trays in direction 1 (step 602). Using step 606, bin section 22 is preset since this bin section has both tray locations free. Then, a direction is assigned to the conveying system and tray location (corresponding to a bin section) using the following calculations of step 608:

1. The conveying system location is assigned a direction based on all conveyor positions between and including the preset bin section and the preset bin section−(number of trays per direction−3). In this example, the preset bin section is 22 and the preset bin section−(number of trays per direction−3) is 21. Thus, the system of the present invention will assign a direction to all conveying system locations associated with bin sections 21 and 22. Two trays will then be loaded and transported onto the conveying system at bin sections 21 and 22.

2. The tray locations will be assigned based on the preset bin location−(number of trays per direction−3). In this example, the tray locations associated with bin sections 22 will be assigned direction 1 (i.e., preset bin location of 22−(4 trays−3)). Two trays will then be loaded for the front and back tray locations at bin section 21.

By way of further example, direction 2 has four flats, which translates into the need for two trays. Using the steps of FIG. 6, it is first determined that there are two trays in direction 2 (step 602). Implementing step 604, it is determined that there are two free trays in bin section 22. Then, a direction 2 is assigned to the two free trays in the front tray location and the back tray location of bin section 22. This same process may be used for directions 3 through 8, 10, 15 and 17–20.

In an example using direction 9, there are seven flats requiring four trays. Using step 602, it is determined that there are more than two trays needed for direction 9. Thus, implementing step 606, bin section 15 is preset since this bin section has both tray locations free, noting that directions 1–8 occupy, partially or fully, bin sections 16–22. Then, using the formula of step 608, a direction is assigned to the conveying system and tray location (corresponding to a bin section) using the following calculations:

1. The conveying system location is assigned based on all conveyor positions between and including the preset bin section and the preset bin section–(number of trays per direction–3). In this example, the preset bin section is 15 and the preset bin section–(number of trays per direction–3) is 14. Thus, the system of the present invention will assign direction 9 to all conveying system locations associated with bin sections 14 and 15. Two trays will then be loaded and transported onto the conveying system at bin sections 14 and 15.

2. The tray locations will be assigned based on the preset bin location–(number of trays per direction–3). In this example, the tray locations associated with bin section 14 will be assigned direction 9 (i.e., preset bin location of 15–(4 trays–3)). This same procedure will be used for the remaining directions requiring three or more trays (i.e., directions 11–14 and 16).

Once all of the trays are properly filled, they will be incrementally and sequentially placed on the conveying system (as discussed with reference to FIG. 5), but now transported to the unloading area for delivery or storage. In this manner, there is no need for sorting of the trays, thus requiring less floor space and less time and expense.

While the invention has been described in terms of preferred embodiments, those skilled in the art will recognize that the invention can be practiced with modification within the spirit and scope of the appended claims.

What is claimed is:

1. A method of sequencing objects in trays located at tray locations of bin sections, comprising the steps of:

pre-assigning a direction to tray locations, where each of the tray locations provides space for trays;

providing an unassigned designation to at least one tray location of the tray locations, the at least one tray location providing tray space such that placement of objects therein remain in sequence;

placing the objects into the trays of the tray locations with the direction corresponding to assigned directions of the objects;

determining whether there are additional objects requiring placement which correspond to the direction and, if so, assigning the direction to an unassigned tray location based on pre-defined rules and placing the objects in the trays of the subsequently assigned tray locations; moving all of the trays with the objects to a feeder in sequential order based on the direction associated with each moved tray;

reassigning the direction in a sequential order to the tray locations based on a number of trays required to hold the objects;

placing the objects into the trays of the tray locations with the reassigned direction corresponding to the directions of the objects; and transporting the trays with the objects to a loading area in a sequential order corresponding to the reassigned direction.

2. The method of claim 1, wherein:

the assigned direction is a set of delivery or storage points; and the reassigned direction is a set of sequenced delivery or storage points;

the sequential order in the reassigning step provides for a lower number reassigned direction to be in front of a higher number reassigned direction for unloading;

the direction includes a same direction or different directions; and the unassigned tray locations include at least one of (i) the at least one tray location having the unassigned designation and (ii) a previously assigned tray location which is now empty due to the tray being filled and moved.

3. The method of claim 1, wherein the tray locations include at least one front tray location and at least one back tray location;

the tray locations are positioned in one or more partitions; and at least one front tray location of each partition includes the unassigned designation.

4. The method of claim 3, wherein the moving step includes the steps of:

(i) determining whether a front tray in the front tray location is filled with objects for a pre-assigned direction;

(ii) determining whether a transporting system is empty in front of the front tray;

(iii) determining whether a lower direction assigned tray will be blocked by moving the front tray onto the transporting system; and (iv) moving the front tray onto the transporting system when steps (i) and (ii) are positive and step (iii) is negative.

5. The method of claim 4, further including the step of waiting until the first pass is complete when at least one of the step (ii) is negative and step (iii) is positive.

6. The method of claim 4, further including the step of moving a back tray to the front tray location and, if required, placing an empty tray at the back tray location.

7. The method of claim 1, wherein the determining step includes assigning a same direction to a further tray when a previous tray is filled with objects for the same direction and additional objects having the same direction requiring placement.

8. The method of claim 7, wherein the determining step assigning the direction to tray locations includes the steps of:

scanning in a sweep direction starting with the location of the previous filled tray having the same direction;

determining whether the scanned tray location has a filled tray; and assigning the scanned tray location the same direction when the tray of the scanned tray location is not filled.

9. The method of claim 7, wherein the determining step assigning the direction to tray locations includes the steps of:

scanning in a sweep direction starting with the location of the previous filled tray having a same direction;

determining that the scanned tray location has a filled tray;

scanning in the sweep direction from the filled tray location;

determining whether a next front tray location is free and all trays on a transporting system in front of the next front tray location toward the sweep direction have a lower or equal direction as the same direction; and assigning the same direction to the next front tray location when the front location is free and all trays on the transporting system towards the sweep direction have the lower or equal direction.

10. The method of claim 7, wherein the determining step assigning the direction to tray locations includes the steps of:

(i) scanning in a sweep direction starting with the location of the previous filled tray having a same direction;

(ii) determining that the scanned tray location has a filled tray;

(iii) scanning in the sweep direction from the filled tray location;

(iv) determining that a next front tray location is not free or all trays on a transporting system in front of the next front tray location toward the sweep direction have a lower or equal direction to the same direction, or both;

(v) determining whether a next back tray location, located behind the next front tray location, is free and the next front tray location has the lower or equal direction; and (vi) assigning the same direction to the next back tray location when the step (v) is positive.

11. The method of claim 1, wherein the reassigning step includes assigning pre-assigned directions to the tray locations based on:

(i) recorded data used in the first pass;

(ii) scanning away from a sweep order; and (iii) assigning a direction to a first available tray location in a direction away from the sweep order starting with a lowest direction.

12. The method of claim 11, wherein the reassigning step further includes the steps of:

determining whether there are more than two trays in a same direction; and assigning the same direction to a next available tray location, always filling a front tray location first, when there are not more than two trays in the same direction.

13. The method of claim 11, further comprising the steps of:

determining that there are more than two trays in a same direction;

setting a bin location to a next bin location where all tray locations are free;

assigning the same direction to all transporting system positions between and including the preset bin location and the preset bin location−(number of trays in the same direction−X); and assigning all required tray locations to the preset bin location−(number of trays in the same direction−X), wherein X is a number of tray locations and transporting system positions per bin location.

14. The method of claim 13, wherein X=3.

15. The method of claim 13, wherein when the preset bin location−(number of trays per direction−X)<0, all left over directions are assigned to any available back tray location.

16. A method of sequencing objects in trays located at tray locations of bin sections, comprising the steps of:

pre-assigning directions to tray locations;

placing an object in a tray in one of the tray locations such that each placed object is related to one of the directions of the tray locations in which the objects are placed;

moving filled trays with the objects through the feeder system in sequential order based on the directions;

reassigning the direction to the tray locations based on a number of trays required to hold the objects in the reassigned direction;

placing the objects into the trays at the tray locations associated with the reassigned directions; and transporting the trays with the objects to an unloading area based on a sequential order of the reassigned directions.

17. The method of claim 16, further comprising the step of providing at least one front tray location with an unassigned designation prior to the moving step.

18. The method of claim 16, further comprising the step of providing an unassigned designation to an empty tray location after the moving step and, if further objects with the direction are present, assigning the direction to the unassigned designation based on predefined rules.

19. The method of claim 16, wherein the moving step includes determining whether lower assigned direction trays remain unblocked and, if so, then moving the tray onto a transporting system.

20. The method of claim 16, further comprising the step of determining whether there are additional objects requiring placement which correspond to the direction and, if so, assigning the direction to an unassigned tray location for placement of the additional objects.

21. The method of claim 20, wherein the determining step includes the steps of:

scanning in a sweep direction starting with a previous filled tray having a same direction;

determining whether the scanned tray location has a filled tray; and assigning the scanned tray location the same direction when a tray of the scanned tray location is not filled.

22. The method of claim 20, wherein the determining step includes the steps of:

scanning in a sweep direction starting with a location of a previous filled tray having a same direction;

determining that the scanned tray location has a filled tray;

scanning in the sweep direction from the filled tray location;

determining whether a next front tray location is available and trays on a transporting system in front of the next front tray location toward the sweep direction have a lower or equal direction as the same direction; and assigning the same direction to the next front tray location when the front location is available and trays on the transporting system towards the sweep direction have the lower or equal direction.

23. The method of claim 20, wherein the determining step includes the steps of:

(i) scanning in a sweep direction starting with the location of a previous filled tray having a same direction;

(ii) determining that the scanned tray location has a filled tray;

(iii) scanning in the sweep direction from the filled tray location;

(iv) determining that a next front tray location is not free or all trays on a transporting system in front of the next front tray location toward the sweep direction have a lower or equal direction to the same direction, or both;

(v) determining whether a next back tray location, located behind the next front tray location, is free and the next front tray location has the lower or equal direction; and (vi) assigning the same direction to the next back tray location when the step (v) is positive.

24. The method of claim 16, further including the step of providing unassigned tray locations to at least one of (i) a tray location having an unassigned designation and (ii) a previously assigned direction tray location now empty due to the tray being moved.

25. The method of claim 24, wherein the reassigned direction is a set of sequenced delivery or storage points and the sequential order in the reassigning step provides for a lower number reassigned direction to be in front of a higher number reassigned direction for unloading.

26. The method of claim 16, wherein the moving step includes the steps of:

(i) determining whether a front tray in a front tray location is filled with objects for a preassigned direction;

(ii) determining whether a transporting system is empty in front of the front tray;

(iii) determining whether a lower direction assigned tray will be blocked by moving the front tray onto the transporting system; and (iv) moving the front tray onto the transporting system when steps (i) and (ii) are positive and step (iii) is negative.

27. The method of claim 26, further including the steps of at least one of:

waiting to move trays having objects therein when at least one of the step (ii) is negative and step (iii) is positive; and moving a back tray to the front tray location and, if required, placing an empty tray at the back tray location.

28. The method of claim 27, wherein the reassigning step includes the steps of:

determining whether there are more than two trays in a same direction; and assigning the same direction to a next available tray location, always filling a front tray location first, when there are not more than two trays in the same direction.

29. The method of claim 27, further comprising the steps of:

determining that there are more than two trays in a same direction;

setting a bin location to a next bin location where all tray locations are free;

assigning the same direction to positions between and including the preset bin location and the preset bin location−(number of trays in the same direction−X); and assigning all required tray locations to the preset bin location−(number of trays in the same direction−X), wherein X is a number of tray locations and transporting system positions per bin location.

30. The method of claim 29, wherein when the preset bin location−(number of trays per direction−X)<0, all left over directions are assigned to any available back tray location.

* * * * *